Nov. 19, 1935.  A. D. SUND  2,021,335
DUST MOP BUMPER
Filed Jan. 16, 1933
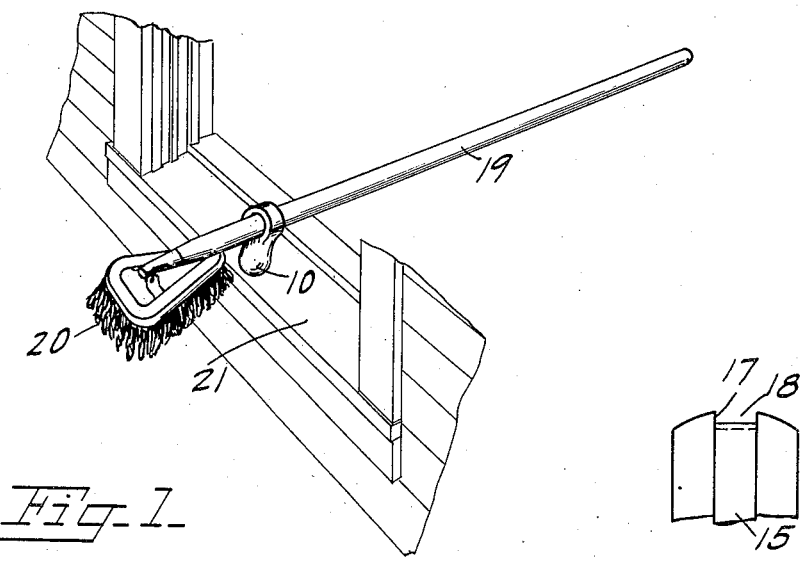
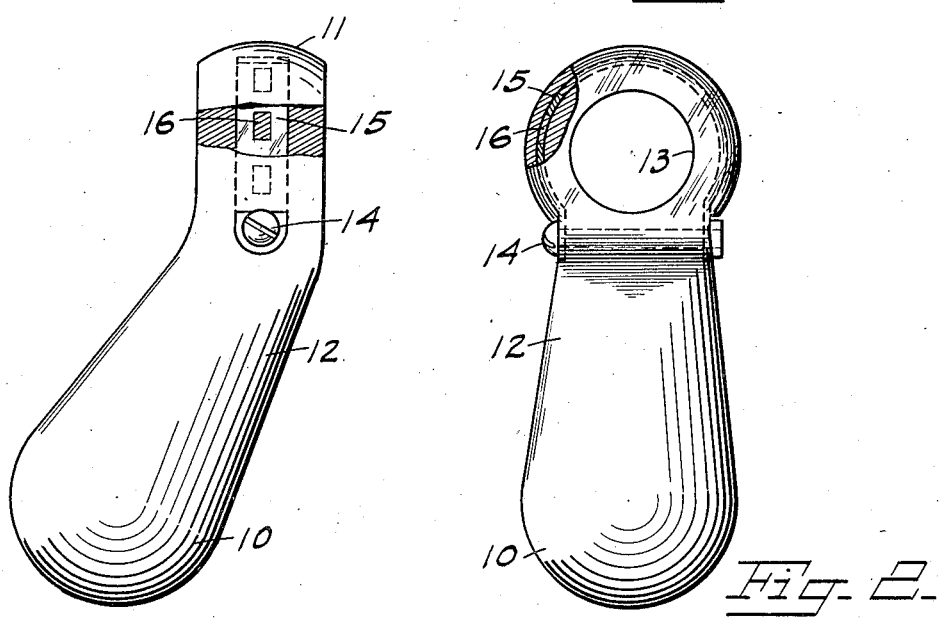
INVENTOR.
Alfred D. Sund
BY Harry C. Schroeder
ATTORNEYS.

Patented Nov. 19, 1935

2,021,335

UNITED STATES PATENT OFFICE 2,021,335

DUST MOP BUMPER

Alfred D. Sund, Santa Rosa, Calif.

Application January 16, 1933, Serial No. 651,908

5 Claims. (Cl. 15—246)

This invention is for a dust mop bumper, and has special reference to a resilient bumper adapted to be applied to or mounted on the handle of a broom, dust mop or similar cleaning implement, and which is used for bumping the dust out of the mop or broom.

One object of the invention is to provide a bumper which is cheaply constructed and conveniently mounted on a handle.

Another object of the invention is to provide a resilient bumper on which metal parts used for clamping are protected by the resilient bumper against contact with furniture, whereby marring of furniture is obviated.

Other objects and advantages of the invention will become apparent as the following description is read on the drawing forming a part of this specification, and in which similar reference characters refer to similar parts throughout the several views, and in which Fig. 1 shows the invention as applied to a floor brush and indicates the method of use;

Fig. 2 is an end elevation of the invention with a portion in section to show the relation of the clamp to the resilient member;

Fig. 3 is a side elevation of the invention with a portion broken away to show the clamp structure;

Fig. 4 is a fragmentary view showing another method of applying the clamp member.

The preferred form of the invention is indicated in Figs. 1 to 4 and consists of a resilient bumper element formed preferably of live rubber and being substantially pear shaped as viewed in Fig. 3, and consisting of a semi-spherical bumper portion 10, a collar-like clamp portion 11, having a convex upper edge the two portions being connected by a tapered portion 12, the bumper portion 10 being angularly related to said clamp portion. The clamp portion 11 is formed with an aperture 13 adapted to receive the handle 19 of a broom, brush, dust mop or similar implement. An aperture is formed transversely of the aperture 13 through the restricted portion to receive a clamp bolt 14. A compressor member 15 formed of resilient metal is molded within the clamp portion 11 and has a plurality of apertures 16 through which the rubber is anchored. Apertures are provided in the ends of members 15 in registry with the transverse aperture in the restricted portion of the bumper.

The compressor member 15 may be mounted by forming a peripheral groove 17 in the rubber to receive the metal strap 15, thus allowing the rubber to extend above the metal and would be similar in every respect except for absence of rubber over the metal as indicated at 18.

The invention is applied by passing the handle 19 through aperture 13 and after positioning adjacent the mop 20 drawing up the clamp bolt 14 which compresses the rubber firmly gripping the handle.

By striking the bumper 10 against a window ledge 21 or other firm object, the dust is shaken out of the mop without the attendant danger of breaking the handle, and more efficient removal of dust and dirt is accomplished.

Having described an operative method of constructing and using the invention, it will be understood that variations in construction and arrangement of parts which are consistent with the appended claims may be resorted to without detracting from the spirit or scope of the invention or sacrificing any of the advantages thereof.

I claim:—

1. A bumper comprising a resilient element of elongated form having a handle-receiving aperture formed through one end thereof, a metal strap encircling said aperture and provided with holes in its ends, a bolt passing through the intermediate portion of said element and also through the holes in said strap, said bolt and said strap being so relatively arranged as to provide a clamp for said resilient element.

2. A bumper comprising a rubber bumper element of elongated form having a handle receiving aperture formed through one end thereof, a metal strap imbedded in said rubber about said aperture having its ends extending to the intermediate portion of the element, and a clamp bolt passing through the ends of said strap and the intermediate portion of said bumper to secure the bumper element to a handle.

3. A bumper comprising an elastic bumper element of elongated tapering form, being approximately hemi-spherical at its larger end and having a collar-like portion at its smaller end, said collar-like portion having an axially disposed handle-receiving aperture formed therethrough, a metal strap embedded in said collar-like portion and extended about said aperture and terminating within the narrowed portion of the bumper element, and a bolt passed through the narrowed portion and the ends of said strap in such manner that the strap is clamped around said restricted portion.

4. A bumper comprising a handle receiving portion having a handle receiving hole formed therethrough and an integral bumper portion formed of rubber, a metal compresser strap embedded in said handle receiving portion and extending about said hole and terminating on opposite sides intermediate the handle receiving portion and the bumper portion, and a clamp bolt passing through said intermediate portion and the ends of said strap to clamp the bumper upon a handle.

5. A bumper comprising a rubber bumper element having a handle receiving hole formed therein, a metal compression strap imbedded in said element substantially surrounding said hole, and a clamp bolt extending through the opposite ends of said strap and through said element adapted to compress the interposed rubber on a handle.

ALFRED D. SUND.